(12) United States Patent
Zhang et al.

(10) Patent No.: US 7,680,180 B2
(45) Date of Patent: Mar. 16, 2010

(54) DECISION FEEDBACK EQUALIZATION WITH COMPOSITE TRELLIS SLICER

(76) Inventors: Yuwei Zhang, 3327 Hartwell Ct., Pleasanton, CA (US) 94588; Kevin Hwang, 7517 Orange Blossom Dr., Cupertino, CA (US) 95014; Jun Lu, 1326 Pebble Ct., San Jose, CA (US) 95131; Shue-Lee Chang, 1833 Mandel Ct., San Jose, CA (US) 95131

( * ) Notice: Subject to any disclaimer, the term of this patent is extended or adjusted under 35 U.S.C. 154(b) by 855 days.

(21) Appl. No.: 11/425,602

(22) Filed: Jun. 21, 2006

(65) Prior Publication Data
US 2007/0140329 A1 Jun. 21, 2007

Related U.S. Application Data

(60) Provisional application No. 60/752,620, filed on Dec. 20, 2005.

(51) Int. Cl.
*H03H 7/30* (2006.01)
*H03H 7/40* (2006.01)
*H03K 5/159* (2006.01)

(52) U.S. Cl. .................. 375/233; 375/329; 375/341; 375/350

(58) Field of Classification Search .................. 375/233, 375/350, 341, 340, 346, 316, 232, 230, 229
See application file for complete search history.

(56) References Cited

U.S. PATENT DOCUMENTS

| | | | |
|---|---|---|---|
| 5,974,091 A | 10/1999 | Huff | |
| 6,178,209 B1 | 1/2001 | Hulyalker et al. | |
| 6,477,208 B1 | 11/2002 | Huff | |
| 6,850,563 B1 | 2/2005 | Hulyalkar | |
| 2003/0189994 A1 * | 10/2003 | Sommer et al. | ............. 375/341 |

FOREIGN PATENT DOCUMENTS

WO  WO 02/087181  10/2002

OTHER PUBLICATIONS

Search Report from corresponding Singapore Application SG-200608683-9 mailed Apr. 7, 2008.
Written Opinion from corresponding Singapore Application SG-200608683-9 mailed Apr. 7, 2008.
Examination Report dated Jan. 15, 2008 in corresponding EP Application 06256354.9.
Extended European Search Report in corresponding European Application 06256354.9 mailed May 3, 2007.

* cited by examiner

*Primary Examiner*—David C Payne
*Assistant Examiner*—Brian J Stevens
(74) *Attorney, Agent, or Firm*—Christensen O'Connor Johnson Kindness PLLC

(57) ABSTRACT

A decision feedback equalizer is configured to equalize an input signal to generate a recovered output signal. Linear feed-forward filter circuitry is configured to provide a linearly filtered output signal based on the input signal. Composite trellis decoder circuitry configured to process a combined signal that is based on a combination of at least the linearly feed-forward filtered output signal and on output of linear or non-linear feedback filter circuitry, in accordance with state metrics generated by processing a composite trellis diagram relative to the combined signal, to provide a trellis-decoded output signal as input to the linear or non-linear feedback filter circuitry. The composite trellis decoder circuitry is further configured to provide a particular phase output of the combined signal, based on the state metrics, as the decoded output signal.

8 Claims, 6 Drawing Sheets

DECISION FEEDBACK EQUALIZATION WITH COMPOSITE TRELLIS SLICER

CROSS REFERENCE TO RELATED APPLICATIONS

This application claims priority under 35 USC §119(e) from provisional application No. 60/752,620, filed Dec. 20, 2005 and entitled ITERATION DECODING FOR ATSC STANDARD (inventor: Yuwei Zhang), which is incorporated herein in its entirety for all purposes.

TECHNICAL FIELD

The invention relates to processing of digital input signals and more particularly to an improved method, system and apparatus to decode trellis-encoded communication signals such as signals encoded according to an Advanced Television Systems Committee (ATSC) standard.

BACKGROUND

A conventional decision feedback equalizer system 100 is shown as FIG. 1. An input digital signal r(n) 102 is a trellis-encoded communication signal, such as a signal that is trellis-encoded according to an ATSC standard. The input digital signal r(n) 102 of equalizer system 100 is typically multipath contaminated. The multipath contamination is caused by multiple signal propagation paths. Multipath contamination is typically a primary contributor to intersymbol interference in information carried within a communication signal.

The input digital signal 102 is provided to a feed-forward linear filter (FFE) 104. After passing the FFE 104, the thus-filtered input signal 106 can be represented as Y(n) by the formula shown in Equation (1):

$$Y(n) = d_n + n_n + isi_n \quad (1)$$

In Equation (1), $d_n$ is the data to be recovered from the input digital signal 102, $n_n$ is white noise in the input digital signal 102, and $isi_n$ is the inter-symbol-interference component of the input digital signal 102. The inter-symbol-interference component is nominally cancelled out by the decision feedback filter (DFE) 108. In FIG. 1, the DFE input 110 comes from a simple slicer 112. However, phase jitter in the output of the FFE 104 reduces the effectiveness of the DFE output in canceling out the inter-symbol-interference in the FFE 104 output.

SUMMARY

In accordance with an aspect, a decision feedback equalizer is configured to equalize an input signal to generate a recovered output signal. Linear feed-forward filter circuitry is configured to provide a linearly filtered output signal based on the input signal. Composite trellis decoder circuitry configured to process a combined signal that is based on a combination of at least the linearly feed-forward filtered output signal and on output of linear or non-linear feedback filter circuitry, in accordance with state metrics generated by processing a composite trellis diagram relative to the combined signal, to provide a trellis-decoded output signal as input to the linear or non-linear feedback filter circuitry. The composite trellis decoder circuitry is further configured to provide a particular phase output of the combined signal, based on the state metrics, as the decoded output signal.

DETAILED DESCRIPTION

Figure 1:
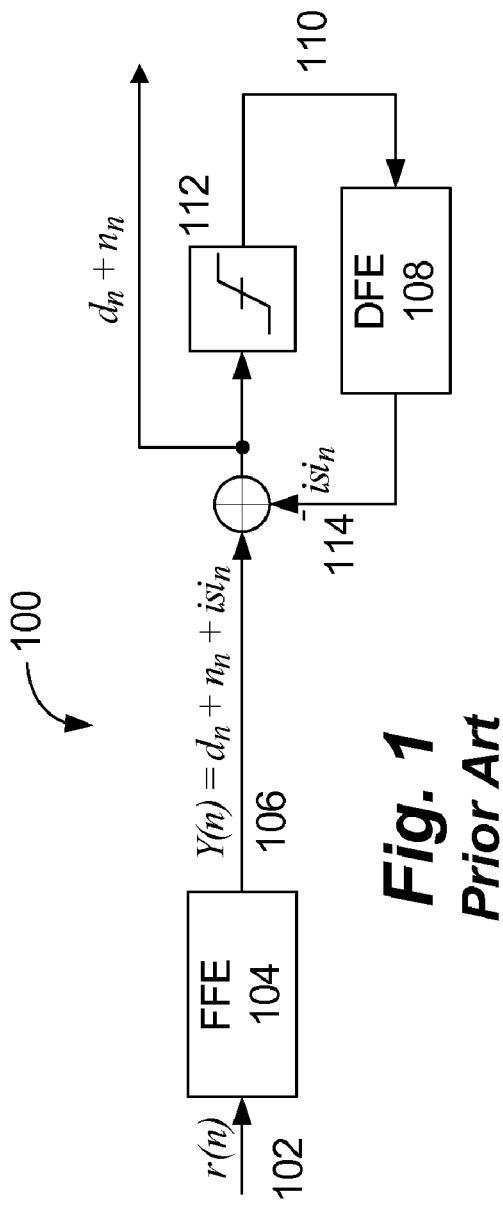
FIG. 1 illustrates a conventional decision feedback equalizer system.

Referring to FIG. 1 discussed in the Background, reducing the slicing error of the simple slicer 112 will improve the accuracy of DFE output $isi_n$ 114. Since the DFE output $isi_n$ 114 is used to cancel the intersymbol interference from the output of the FFE 104, improving the accuracy of the DFE output $isi_n$ 114 should result in an overall improvement in performance of the equalizer system 100.

Figure 2:
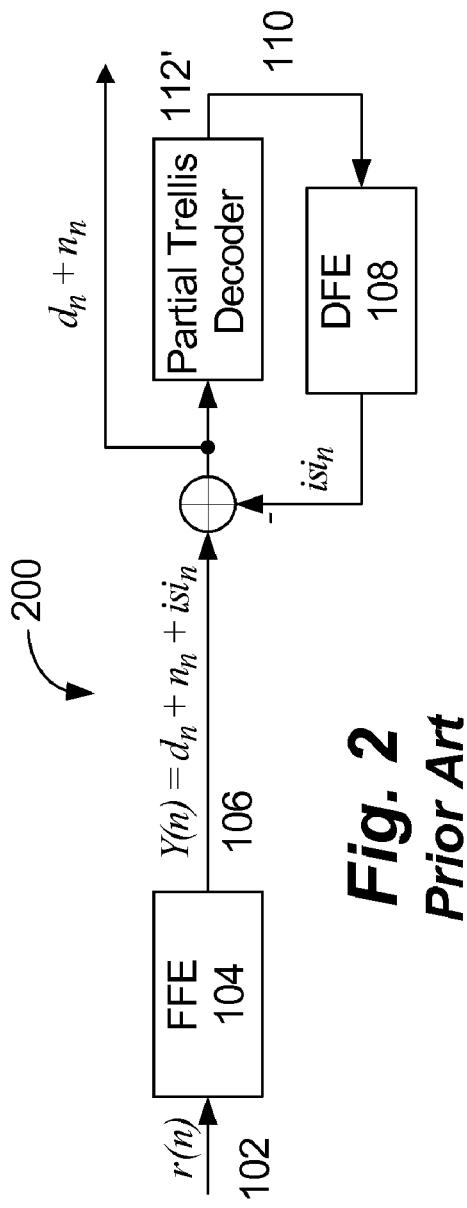
FIG. 2 is similar to FIG. 1, but discloses using a partial trellis decoder in place of a simple slicer.
Figure 3:
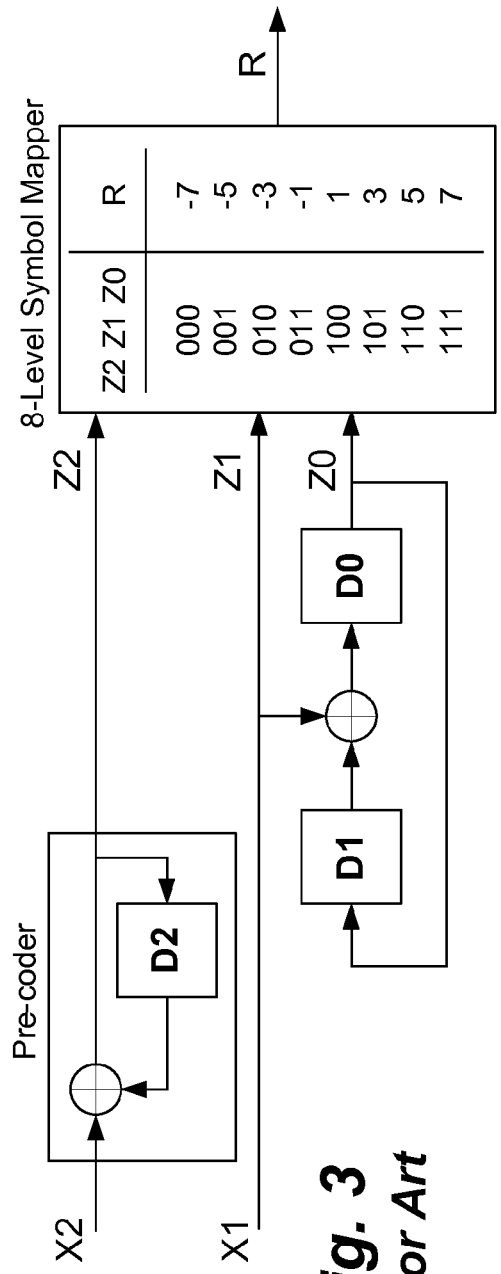
FIG. 3 illustrates a portion of a trellis encoder that conforms to an ATSC standard.

N. Hulyalkar et al. has disclosed using a partial trellis decoder in place of the simple slicer 112, as shown in FIG. 2. The partial trellis decoder is shown as element 112' in FIG. 2. FIG. 3 illustrates a portion of a trellis coder (i.e., on the encoding side, as opposed to the decoding side) that conforms to an ATSC standard. With the trellis coding that conforms to the ATSC standard, the partial trellis decoder (112', FIG. 2) outperforms the simple slicer (112, FIG. 1) by about 4 to 6 dB (in terms of decision error probability) under an additional white Gaussian noise channel condition.

Thus, the use of the partial trellis decoder 112' theoretically results in a significant improvement of equalizer performance, as opposed to using the simple slicer 112. However, the above discussion assumes an ideal case, that is, a case in which the input signal of the equalizer is free from carrier offset and/or phase jitter. However, the actual situation is typically much different from the ideal case.

Figure 4:
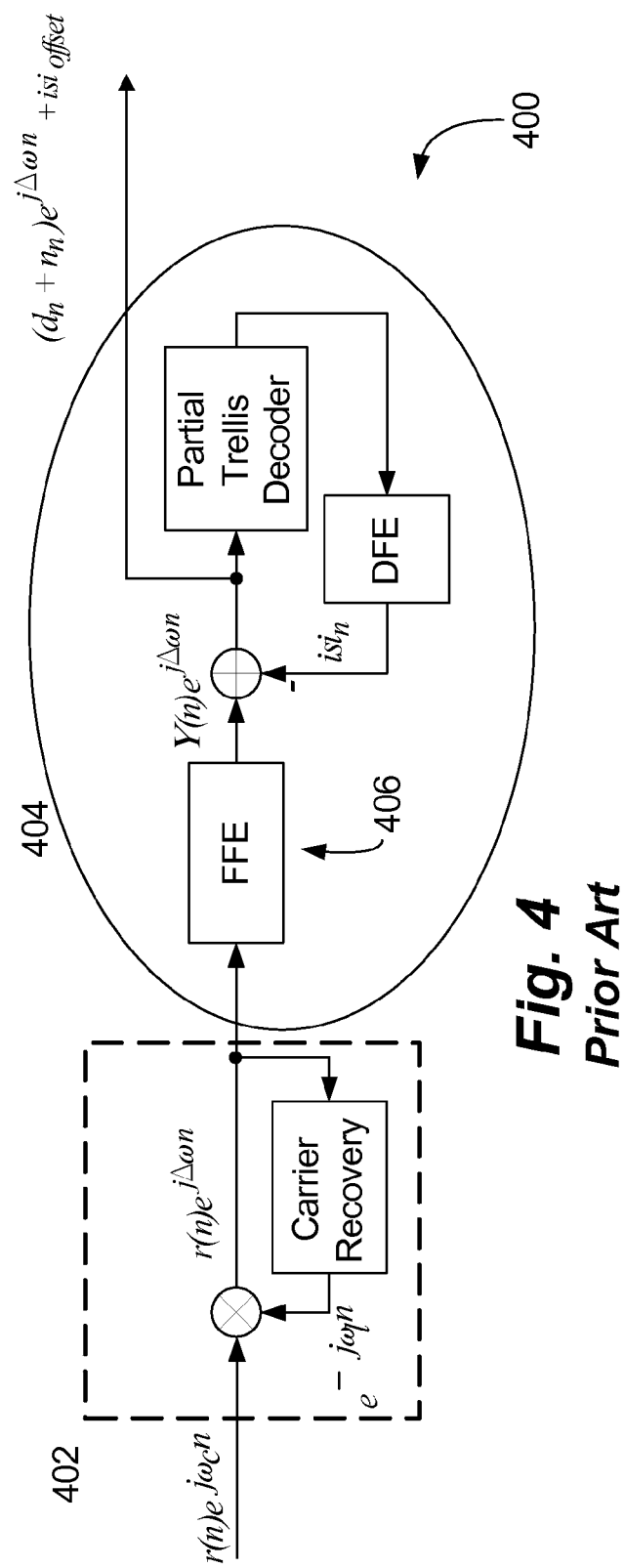
FIG. 4 illustrates a decision feedback equalizer system in which a carrier recovery loop portion is included, as well as an equalizer portion.

To address the carrier offset, carrier recovery functionality may be included. FIG. 4 shows a system block diagram of a decision feedback equalizer system 400 in which a carrier recovery loop portion 402 is included, as well as an equalizer portion 404. We now discuss a theory of operation of the decision feedback equalizer system 400 shown in FIG. 4.

Let $\omega_c$ denote the signal carrier frequency and $\omega_1$ denote the local carrier frequency. The carrier offset $\Delta\omega$ is characterized as shown in Equation (2):

$$\Delta\omega = \omega_c - \omega_1 \quad (2)$$

Thus, the input to the equalizer portion 404 (i.e., the output of the carrier recovery loop 402) can be expressed as $r(n)e^{j\Delta\omega n}$. If W(n) denotes the FFE 406 output, then:

$$W(n) = \sum_{i=0}^{N-1} C_i r(n-i) e^{j\Delta\omega(n-i)} \quad (3)$$

$$= e^{j\Delta\omega n} \sum_{i=0}^{N-1} C_i r(n-i) e^{-j\Delta\omega i}$$

$$= Y(n) e^{j\Delta\omega n}$$

In Equation (3), N denotes the number of taps of the FFE 406, and $C_i$ (i=0, 1, . . . N−1) is the coefficient of taps.

When the carrier recovery loop 402 gets lock, $\Delta\omega$ will trend to close to zero, with a small residual offset that is independent of time. So, in equation (3), $e^{-j\Delta\omega i}$ (i=0, 1, . . . N−1) is independent of time and can be compensated by the FFE 406 with properly adjusted tap coefficients. On the other hand, the phase factor, $e^{j\Delta\omega n}$ is a time related variable and should be the major source of phase jitter. Therefore, under a phase jitter condition, the FFE 406 should produce the same output as in the ideal case, except for the phase factor.

With the effect of the phase factor, however well the slicer (e.g., either the simple slicer 112 in FIG. 1 or the partial trellis decoder 112' in FIG. 2) performs, the final output of the equalizer 100 or 200 will be $$E(n) = Y(n)e^{j\Delta\omega n} + ISI_n \quad (4)$$

$$= (d_n + n_n + ISI_n)e^{j\Delta\omega n} + ISI_n$$

$$= (d_n + n_n)e^{j\Delta\omega n} + ISI_{offset}$$

where $ISI_{offset}$ is the total equivalent inter-symbol-interference. Even if the inter-symbol-interference could approach zero, the equalizer output will still contain a phase factor, which will lower the signal-to-noise ratio of the final output.

Figure 5:
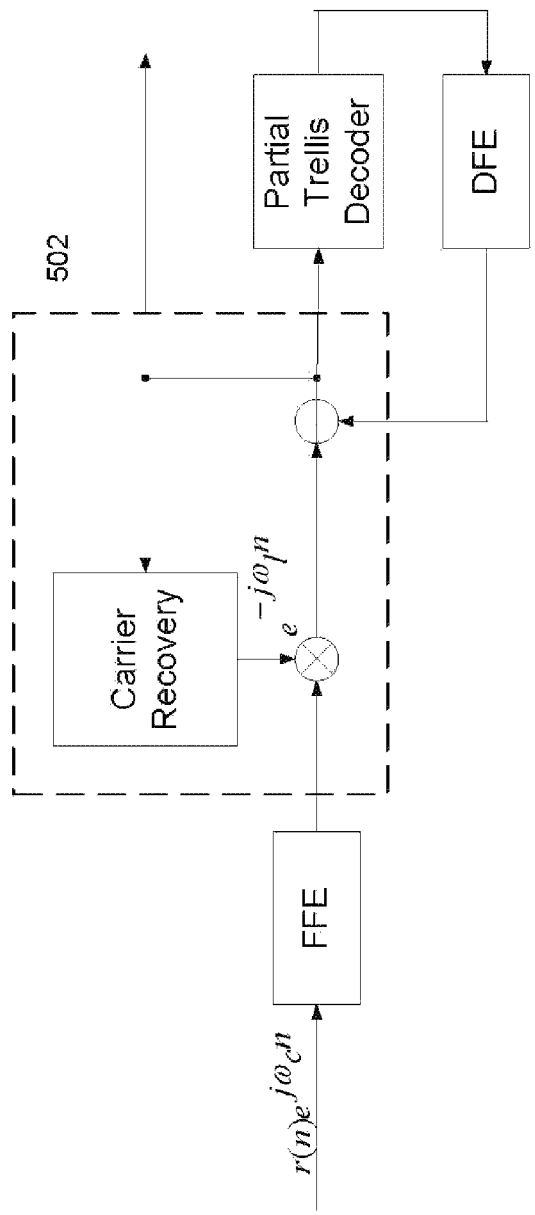
FIG. 5 illustrates an equalizer in which a carrier recovery loop is placed after the FFE.

From equation (3), it can be seen that the phase property of the FFE input 102 (using the reference numerals of FIGS. 1 and 2) can be transparently transferred to the FFE output 106. For example, as shown in FIG. 5, the carrier recovery loop (shown as 502 in FIG. 5) can be moved to after the FFE. However, with this structure, the phase factor is still an issue for the slicing functionality. In addition, function blocks ahead of the FFE (for example, a channel estimator) will be operating under the carrier offset condition.

For decoding a signal encoded according to a continuous phase modulation (CPM) encoding scheme, R. Huff proposed a composite trellis concept for carrier recovery based on the inherent phase trellis structure of CPM. See U.S. Pat. No. 5,974,091, issued Oct. 26, 1999. Huff also discloses generalizing the composite trellis concept to other modulation schemes.

Figure 6:
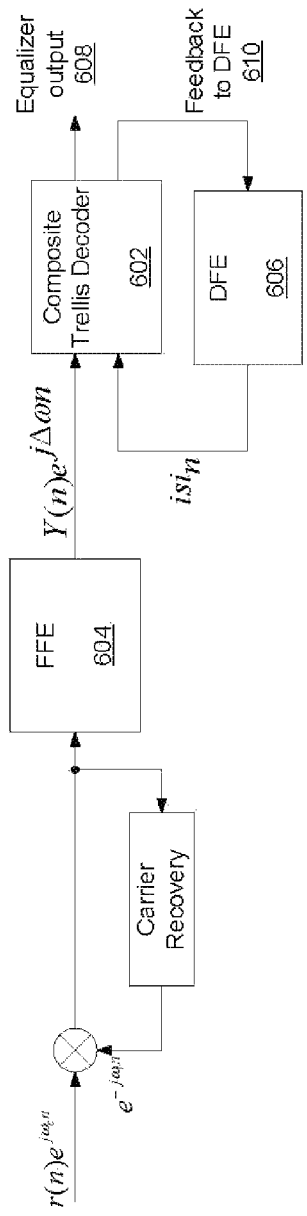
FIG. 6 illustrates a composite trellis decoder being employed in place of a simple slicer or of a partial trellis decoder.
Figure 9:
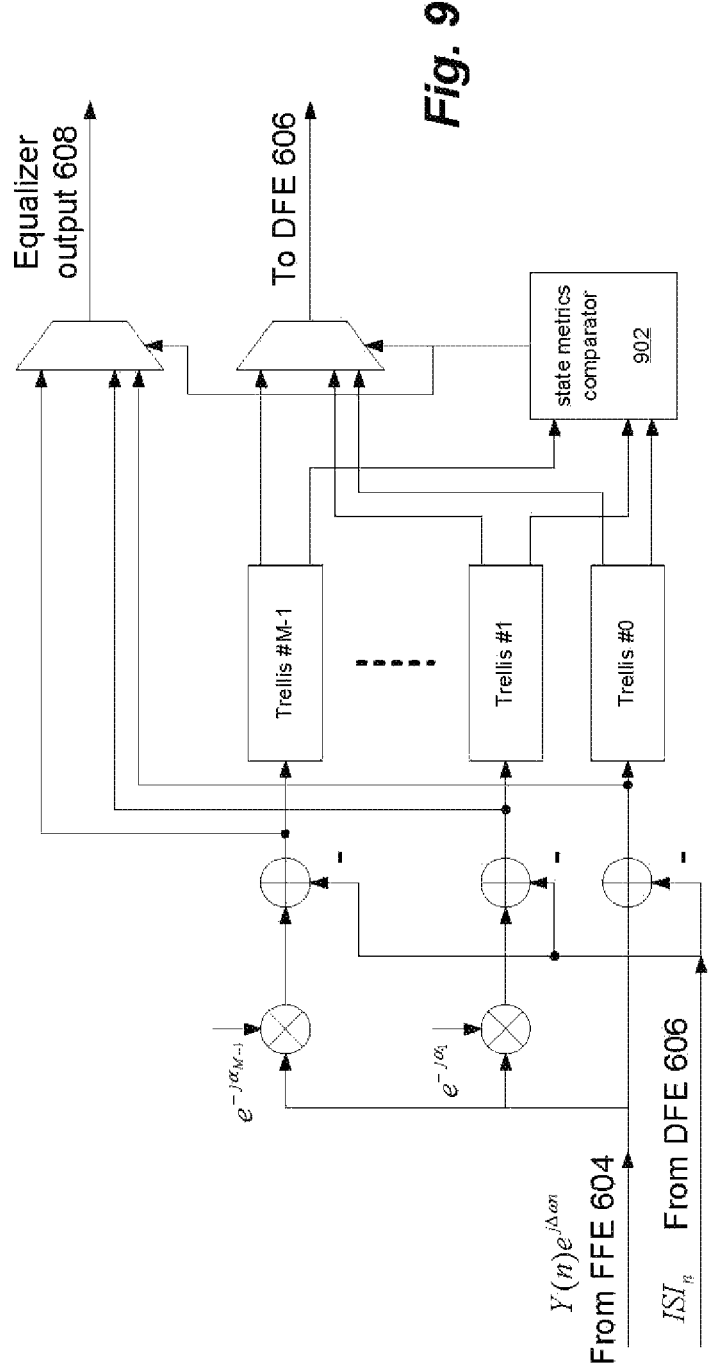
FIG. 9 illustrates a composite trellis slicer.

Referring to FIG. 6, the inventor has realized that the composite trellis decoder technique (composite trellis decoder 602) can be utilized to process the output of the FFE 604 and of the DFE 606. Referring to FIG. 9 as well, from the output of the FFE 604 and of the DFE 606, the composite trellis decoder 602 determines a signal 610 to feedback as input to the DFE 606, as well as determining the equalizer output 608. For example, the same state metrics comparator 902 (and even the same state metrics comparator 902 output signal) may be used to determine each of the equalizer output 608 and the signal 610 to feedback as input to the DFE 606.

Figure 7:
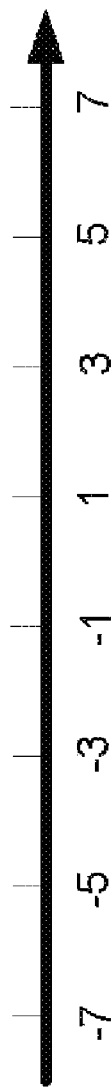
FIG. 7 shows a system ideal constellation of 8VSB for a jitter-free condition.

Thus, for example, to account for the effect of the phase factor, as discussed extensively above, the composite trellis technique may be employed. For 8VSB (8-level vestigial sideband, the RF modulation scheme used by digital television, in accordance with the ATSC encoding standard), FIG. 7 shows a system ideal constellation for a jitter-free condition.

Figure 8:
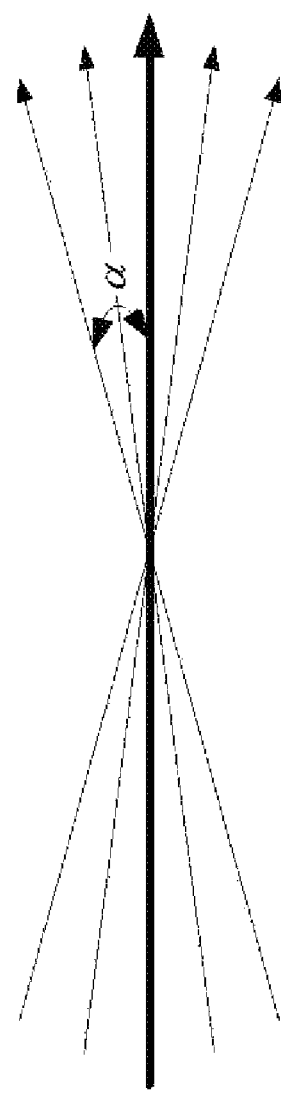
FIG. 8 illustrates an example of the constellation of 8VSB under a phase jitter condition.
Figure 10:
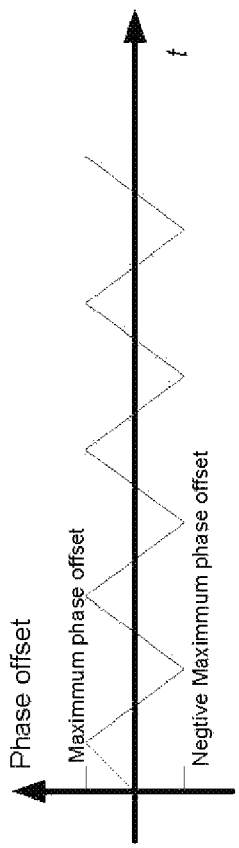
FIG. 10 illustrates a simulation model of phase jitter.

An example of the constellation of 8VSB is shown in FIG. 8 under a phase jitter condition. To address the effect of the phase jitter, the composite trellis decoder is included, such as shown in FIG. 9. A simulation model of phase jitter is shown in FIG. 10, and the simulation results are shown in FIG. 11.

Details of operation of a simple composite trellis decoder are provided in U.S. Pat. No. 5,974,091, incorporated herein by reference in its entirety. As mentioned above, in the FIG. 9 composite trellis decoder, the same output of the state metrics comparator 902 is used to determine each of the equalizer output 608 and the signal 610 to feedback as input to the DFE 606. It can be said, then, that the composite trellis decoder 902 operates to reliably decode the output of the FFE, even in the presence of significant phase jitter in the signal being output from the FFE.

Figure 11:
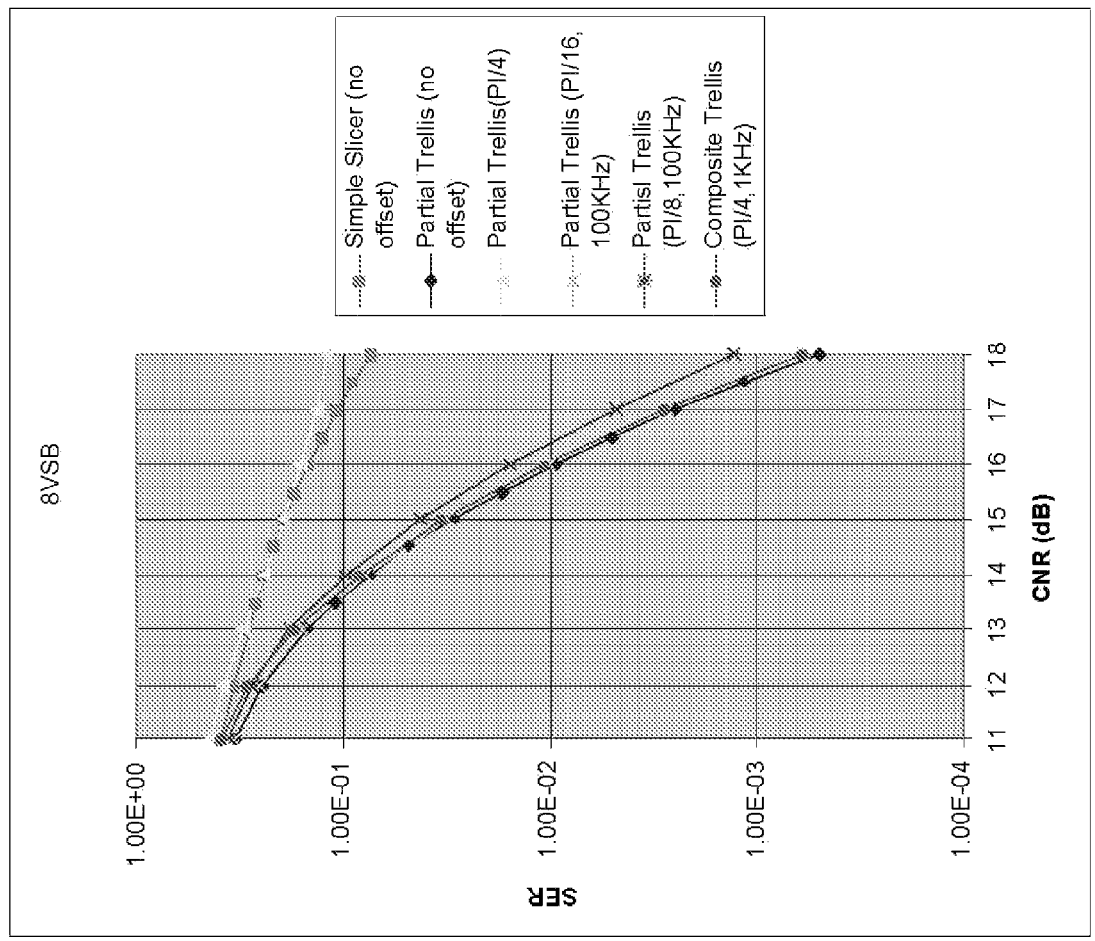
FIG. 11 illustrates simulation results, of decoding using a decoder like the FIG. 6 decoder, of the simulation model of FIG. 10.

The simulation results shown in FIG. 11 illustrate that the performance of a conventional partial trellis slicer is dominated by the maximum phase offset value, rather than by the time variation of phase offset. When the maximum offset value is less than $\pi/16$, the partial trellis slicer works well and is not very much affected by phase jitter. When the maximum offset value reaches $\pi/8$, however, the performance of the partial trellis slicer is obviously degraded. When the maximum offset value reaches $\pi/4$, the performance of the partial trellis slicer is overwhelmed by the phase jitter effect, while the composite trellis decoder still works well under the same condition.

What is claimed is:

1. A decision feedback equalizer system configured to equalize an input signal and to compensate for a phase factor component generated in the system such that an output signal decoded by the system reduces the influence by the phase factor component, the system comprising:

a linear feed-forward filter circuit configured to provide a linearly filtered output signal based on the input signal, the linearly filtered output signal containing the phase factor component;

a linear or non-linear feedback filter circuit configured to provide an output feedback filter circuit signal; and a composite trellis decoder circuit coupled to the linear feed-forward filter circuit, the composite trellis decoder circuit including a state metrics comparator and configured to:

process a combined signal input into the composite trellis decoder circuit in accordance with state metrics generated by processing a composite trellis diagram relative to the combined signal in the state metrics comparator, the combined signal being based on a combination of at least the linearly filtered output signal and the output feedback filter circuit signal, provide a trellis-decoded output signal determined by a state metrics comparator output signal, the state metrics comparator output signal being produced by the state metrics comparator as a result of the processing a composite trellis diagram, wherein the trellis-decoded output signal is supplied as an input to the linear or non-linear feedback filter circuit, and generate a particular phase output of the combined signal, determined by the state metrics comparator output signal as the decoded output signal, wherein the linear or non-linear feedback filter circuit is coupled to the composite trellis circuit and configured to receive and process the trellis-decoded output signal from the composite trellis circuit, and wherein the processing the combined signal input into the composite trellis decoder circuit compensates for the phase factor component present in the linearly filtered output signal.

2. The equalizer of claim 1, further comprising:

a carrier recovery circuit configured to offset time-dependent phase information from the input signal prior to the input signal being provided to the composite trellis decoder circuit.

3. The system of claim 1, wherein the input signal is a trellis-encoded communications signal.

4. The system of claim 1, wherein the trellis-encoded communications signal is encoded according to a process substantially compliant with an Advanced Television Systems Committee standard.

5. A method of decoding an input signal by a decision feedback equalizer system configured to generate a decoded output signal, the method comprising:

linearly filtering the input signal with a linear feed-forward filter circuit to provide a linearly filtered output signal based on the input signal, the linearly filtered output signal containing a phase factor component;

outputting a feedback filter signal from a feedback filter circuit in response to a trellis-decoded output signal produced by a composite trellis circuit and applied as an input to the feedback filter circuit;

providing the linearly filtered output signal provided by the linear feed-forward filter circuit and the feedback filter signal output by the feedback filter circuit to the composite trellis circuit;

processing a combined signal with the composite trellis circuit, the combined signal comprising the linearly filtered output signal and the feedback filter signal, wherein the processing is executed in accordance with state metrics generated in a state metrics comparator included in the composite trellis circuit by processing a composite trellis diagram relative to the combined signal, by:

generating the trellis-decoded output signal that is applied as an input to the feedback filter circuit, wherein the trellis-decoded output signal is determined by the state metrics comparator as a result of the processing a composite trellis diagram; and generating a particular phase output of the combined signal determined by the state metrics comparator as a result of the processing a composite trellis diagram as the decoded output signal.

6. The method of claim 5, further comprising:

offsetting time-dependent phase information from the input signal prior to the input signal being linearly filtered.

7. The method of claim 5, wherein the input signal is a trellis-encoded communications signal.

8. The method of claim 7, wherein the trellis-encoded communications signal is encoded according to a process substantially compliant with an Advanced Television Systems Committee standard.

* * * * *